United States Patent
Tulloch

(10) Patent No.: US 11,834,169 B2
(45) Date of Patent: Dec. 5, 2023

(54) WINGBOX WITH REMOVABLE FUEL TANK

(71) Applicant: Airbus Operations Limited, Bristol (GB)

(72) Inventor: William Tulloch, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 17/652,355

(22) Filed: Feb. 24, 2022

(65) Prior Publication Data

US 2022/0274684 A1    Sep. 1, 2022

(30) Foreign Application Priority Data

Feb. 25, 2021  (GB) ..................................... 2102724

(51) Int. Cl.
| | | |
|---|---|---|
| *B64C 3/34* | (2006.01) | |
| *B64C 3/18* | (2006.01) | |
| *B64D 37/30* | (2006.01) | |

(52) U.S. Cl.
CPC ................. *B64C 3/34* (2013.01); *B64C 3/185* (2013.01); *B64D 37/30* (2013.01)

(58) Field of Classification Search
CPC ............ B64C 3/34; B64C 3/185; B64C 3/187
See application file for complete search history.

(56) References Cited

U.S. PATENT DOCUMENTS

| | | | |
|---|---|---|---|
| 7,806,365 B2 | 10/2010 | Miller et al. | |
| 7,871,042 B2 | 1/2011 | Velicki et al. | |
| 2004/0217231 A1* | 11/2004 | D' Auvergne | B64G 1/402 244/63 |
| 2012/0025006 A1 | 2/2012 | Luther | |
| 2015/0069184 A1* | 3/2015 | Barmichev | B64D 37/30 244/135 R |
| 2015/0217869 A1 | 8/2015 | Brunaux et al. | |

FOREIGN PATENT DOCUMENTS

| | | |
|---|---|---|
| CN | 205615721 | 10/2016 |
| CN | 207631504 | 7/2018 |
| CN | 207658075 | 7/2018 |
| GB | 505202 | 5/1939 |
| GB | 582704 | 11/1946 |

OTHER PUBLICATIONS

Combined Search and Examination Report for GB2102724.8 dated Aug. 9, 2021, 7 pages.

* cited by examiner

*Primary Examiner* — Nicholas McFall
*Assistant Examiner* — Eric Acosta
(74) *Attorney, Agent, or Firm* — Nixon & Vanderhye P.C.

(57) ABSTRACT

An aircraft wingbox assembly is disclosed having a wingbox with an upper cover, a lower cover and a pair of spars; a plurality of ribs in the wingbox. The ribs divide the wingbox into bays. A fuel tank is in a first one of the bays. One of the spars includes a spar hole which is configured to enable the fuel tank to be removed from the first one of the bays through the spar hole.

20 Claims, 5 Drawing Sheets

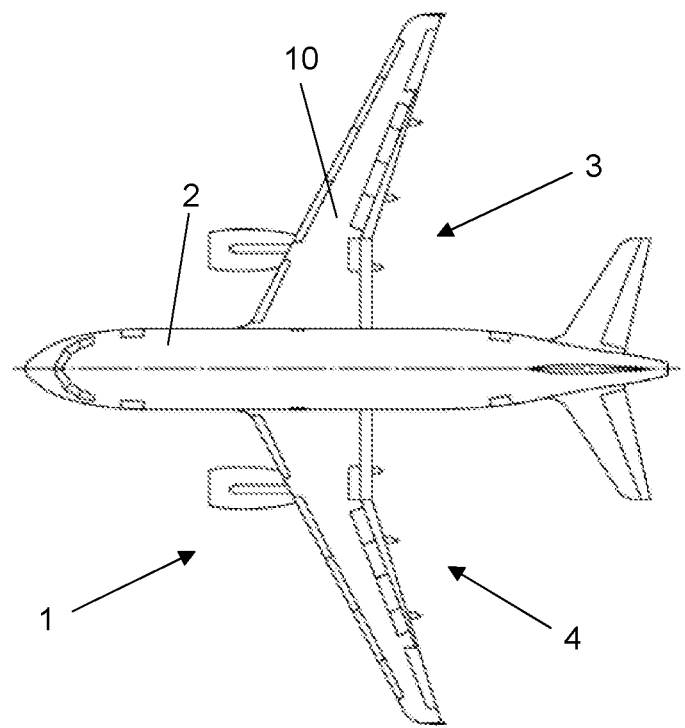
FIG. 1
FIG. 2
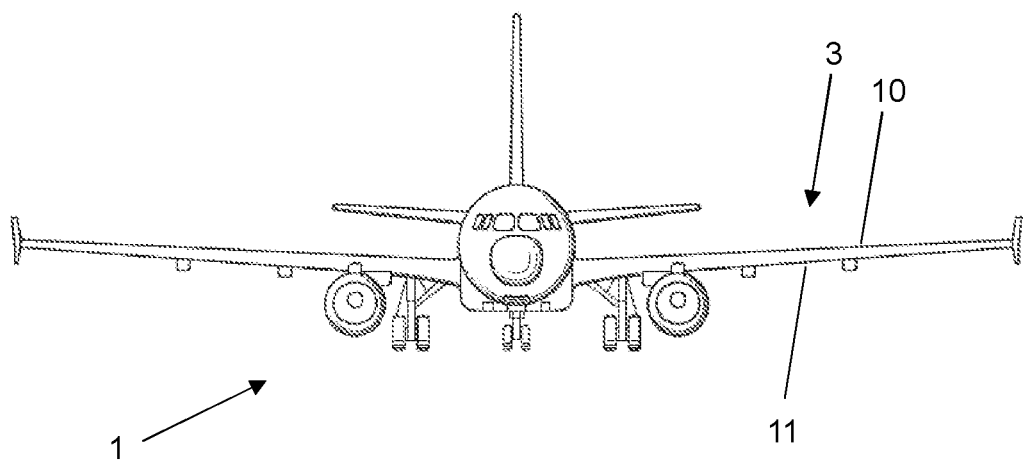

FIG. 10A  FIG. 10B  FIG. 10C
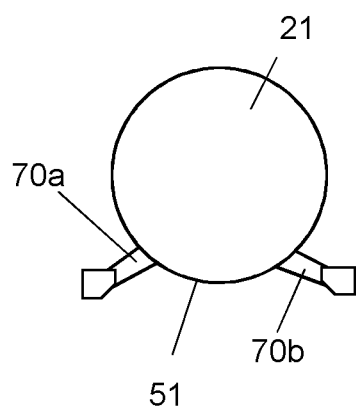
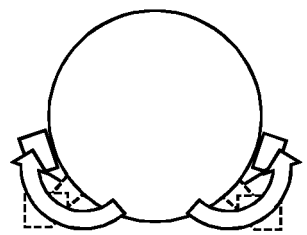
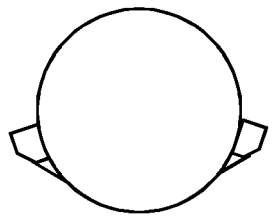
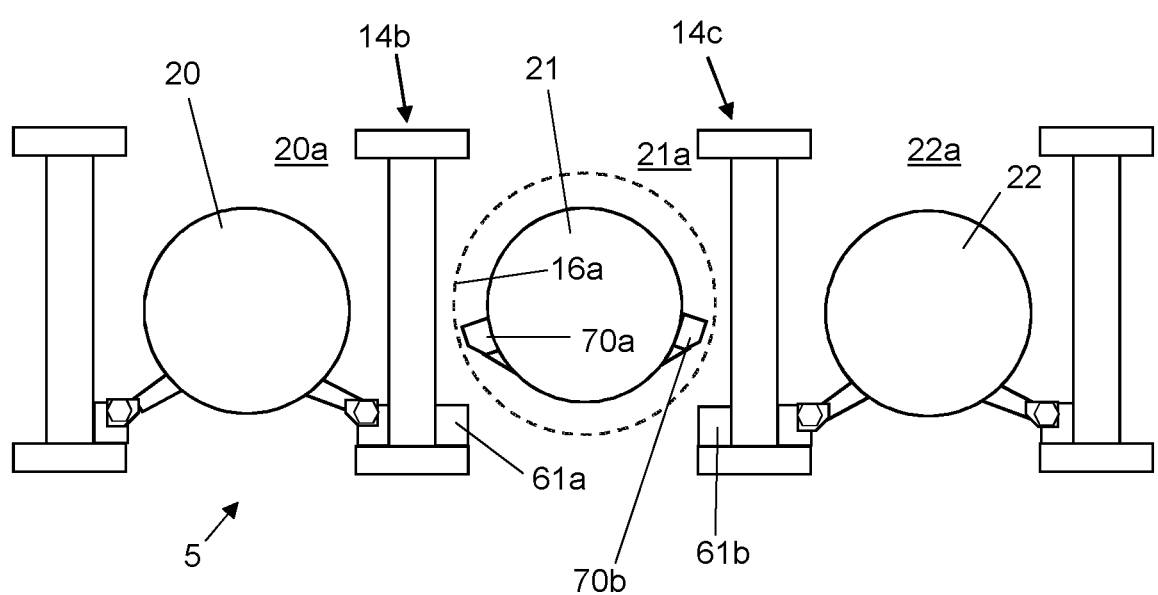
FIG. 11

WINGBOX WITH REMOVABLE FUEL TANK

CROSS RELATED APPLICATION

This application claims priority to United Kingdom Patent Application GB2102724.8, filed Feb. 25, 2021, the entire contents of which is hereby incorporated by reference.

FIELD OF THE INVENTION

The present invention relates to an aircraft wingbox assembly with a removable fuel tank; a method of disassembling such an assembly; and a spar for an aircraft wingbox. Typically but not exclusively, the fuel tank is a hydrogen fuel tank.

BACKGROUND OF THE INVENTION

Hydrogen energy fueled aircraft typically store hydrogen tanks within the fuselage for simplicity. This leads to an inefficient design as the wings are unused. The hydrogen tanks also may be need to be replaced during the lifetime of the aircraft.

SUMMARY OF THE INVENTION

A first aspect of the invention provides an aircraft wingbox assembly comprising: a wingbox with an upper cover, a lower cover and a pair of spars; a plurality of ribs in the wingbox, wherein the ribs divide the wingbox into bays; and a fuel tank in a first one of the bays, wherein one of the spars comprises a spar hole which is configured to enable the fuel tank to be removed from the first one of the bays through the spar hole.

Optionally the aircraft wingbox assembly further comprises a door covering the spar hole; and fasteners attaching the door to the spar.

Optionally the first one of the bays is between a first one of the ribs and a second one of the ribs.

Optionally the fuel tank comprises a tank wall and first and second tank lugs extending from the fuel tank wall; and the assembly further comprises: a first fastener attaching the first tank lug to the first one of the ribs; and a second fastener attaching the second tank lug to the second one of the ribs, wherein the fuel tanks and the spar hole are configured to enable the fuel tank including both of the tank lugs to pass through the spar hole.

Optionally the fuel tank is a hydrogen fuel tank.

Optionally the fuel tank is tubular.

Optionally the fuel tank comprises a rigid tank wall.

Optionally the fuel tank contains a fuel which is a pressurised gas or a cryogenically cooled liquid.

Optionally the spars are spaced apart in a chordwise direction, and a length of the fuel tank extends in the chordwise direction.

Optionally the spars extend in a spanwise direction; and the bays are spaced apart in the spanwise direction.

Optionally only one fuel tank is in the first one of the bays.

Optionally the fuel tank is a first fuel tank; the pair of spars comprise a forward spar and a rear spar; and the assembly further comprises: a fuel cell; a first fuel line coupling the first fuel tank to the fuel cell; a second fuel tank in a second one of the bays; and a second fuel line coupling the second fuel tank to the fuel cell, wherein the first fuel line is located behind the rear spar and the second fuel line is located in front of the front spar.

A further aspect of the invention provides a method of disassembling an aircraft wingbox assembly according to the first aspect, the method comprising: removing the fuel tank from the first one of the bays through the spar hole.

Optionally the method further comprises removing a door covering the spar hole.

Optionally the fuel tank is attached to the wingbox or to one or more of the ribs by one or more fasteners, and the method further comprises inserting a tool into the first one of the bays, and disengaging the fastener(s) with the tool.

Optionally the fuel tank has a length, and the fuel tank moves along its length as it is removed through the spar hole.

Optionally the fuel tank comprises a fuel tank wall which is not collapsed before the fuel tank is removed.

A further aspect of the invention provides an aircraft wing comprising an aircraft wingbox assembly according to the first aspect of the invention.

A further aspect of the invention provides an aircraft comprising an aircraft wingbox assembly according to the first aspect of the invention.

A further aspect of the invention provides a spar for an aircraft wingbox, the spar comprising: a spar web; a spar flange; and a spar hole in the spar web, wherein the spar hole is sized to enable a fuel tank to be removed through the spar hole.

Optionally the spar further comprises a door covering the spar hole; and fasteners attaching the door to the spar.

The spar may have only a single spar flange, but more preferably the spar comprises a pair of spar flanges.

The pair of spar flanges may comprise an upper spar flange for attaching the spar to an upper cover of the aircraft wingbox, and a lower spar flange for attaching the spar to a lower cover of the aircraft wingbox.

BRIEF DESCRIPTION OF THE DRAWINGS

Embodiments of the invention will now be described with reference to the accompanying drawings, in which:

FIG. 1 is a plan view of an aircraft;

FIG. 2 is a front view of the aircraft of FIG. 1;

FIG. 10A is a front view of a fuel tank with retractable lugs;

FIG. 10B shows the retractable lugs being retracted;

FIG. 10C shows the retractable lugs in their retracted state; and

FIG. 11 shows the fuel tank of FIG. 10C with its lugs retracted ready to be removed through the spar hole.

DETAILED DESCRIPTION OF EMBODIMENT(S)

Figure 3:
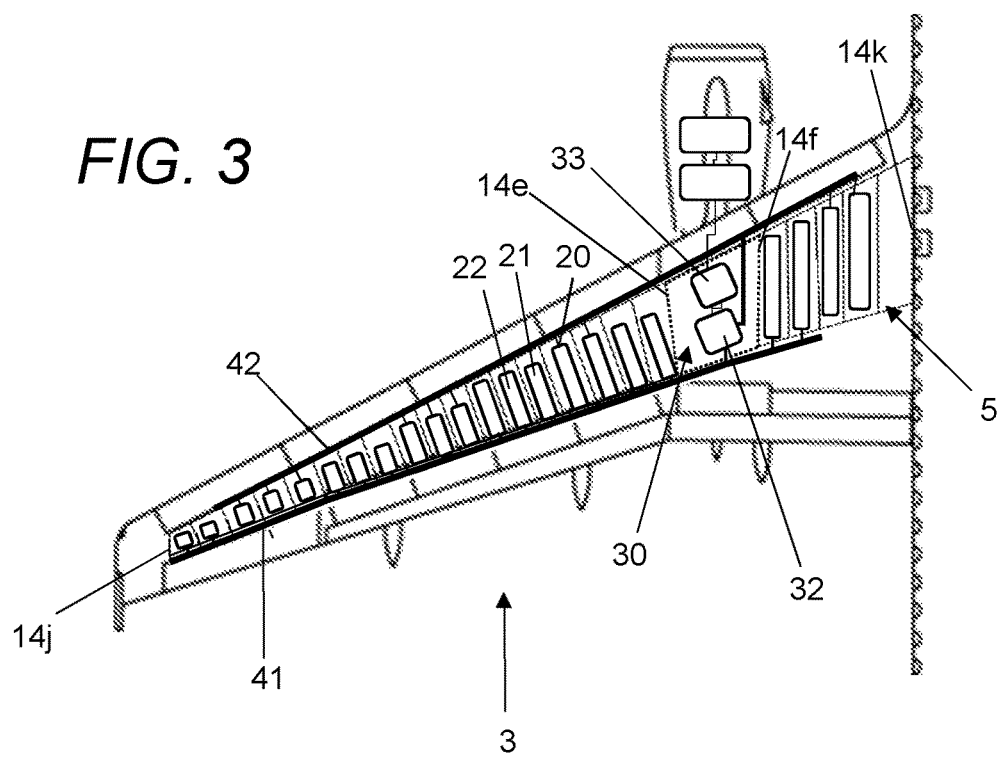
FIG. 3 is a plan view of the port wing showing various internal components.

An aircraft 1 is shown in FIGS. 1 and 2 and comprises a fuselage 2 and a pair of wings 3, 4. Each wing comprises a wingbox assembly 5 shown in FIG. 7. The wingbox assembly 5 comprises a wingbox with an upper cover 10, a lower cover 11, and a pair of spars (front spar 12 and rear spar 13).

Figure 4A:
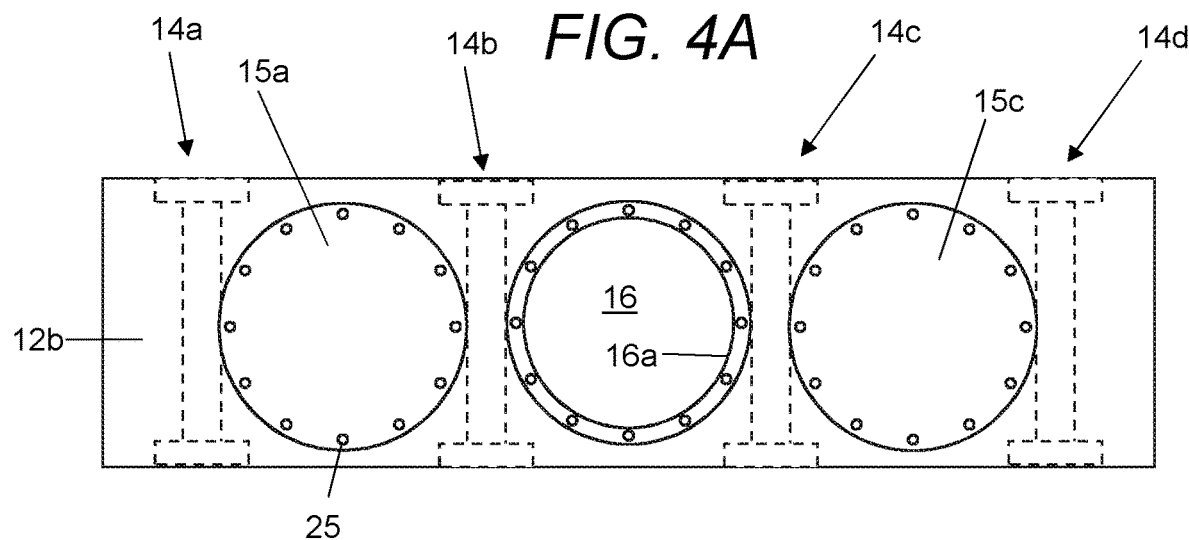
FIG. 4A is a front view of part of the wingbox with a door removed.
Figure 4B:
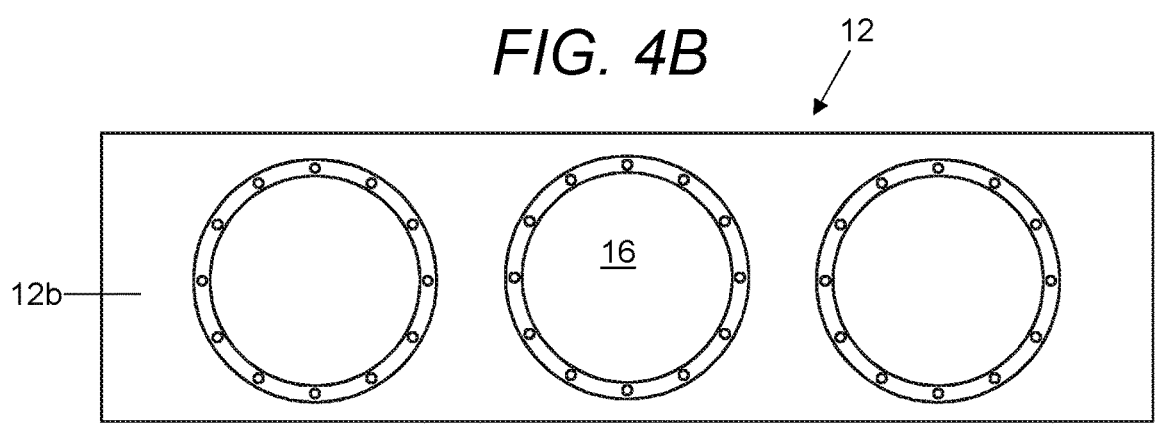
FIG. 4B is a front view of part of the front spar with all doors removed.

FIG. 3 is a plan view of the port wing 3 with various internal parts shown. FIGS. 4A and 4B show part of the front spar 12.

The wingbox assembly 5 includes a plurality of ribs in the wingbox which extend in a chordwise direction and divide the wingbox into bays. The ribs and the bays are spaced apart in a spanwise direction along the wing 3.

In this example there are twenty six ribs and twenty four bays, although the number of ribs may vary. The ribs include an inboard rib 14k at the root of the wingbox, an outboard rib 14j at the tip of the wingbox and twenty four intermediate ribs, four of which are shown in FIG. 4A and labelled 14a-d. Each of the ribs is attached to both of the covers 10, 11 and to both of the spars 12, 13.

The wingbox assembly 5 also has twenty two cylindrical hydrogen fuel tanks which are located inside the wingbox. The fuel tanks may contain pressurised hydrogen gas, or cryogenically cooled hydrogen liquid. The number of fuel tanks may vary.

Figure 5:
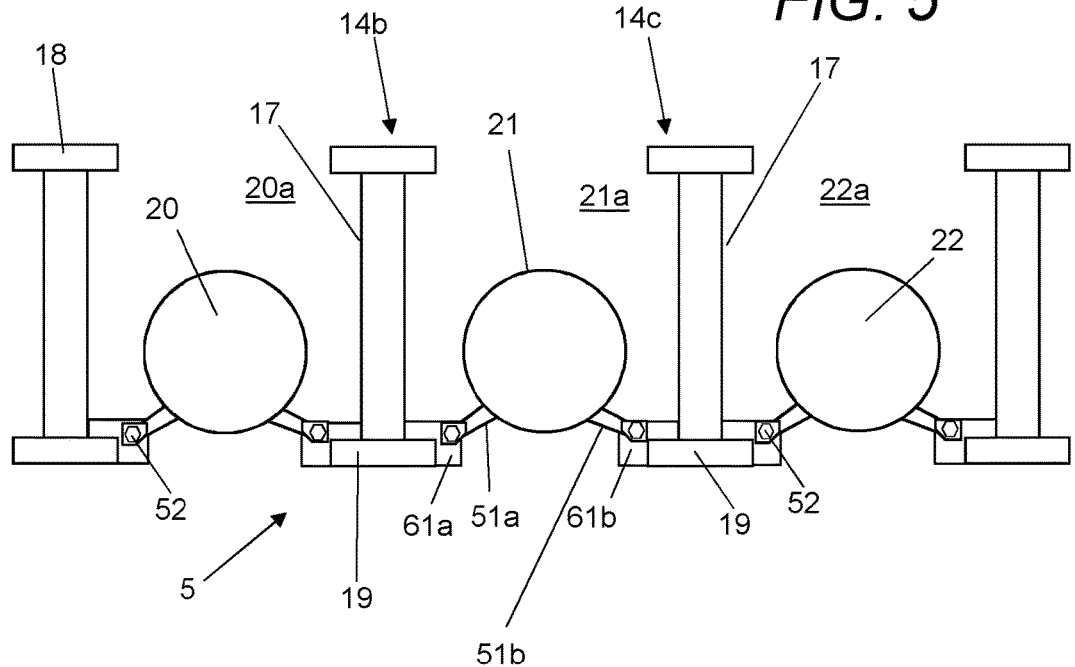
FIG. 5 is a front view of part of the wingbox assembly showing three exemplary fuel tanks.

FIG. 5 show a front view of part of the wingbox assembly 5, with the front spar 12 and the covers 10, 11 omitted for clarity, and showing three exemplary fuel tanks 20, 21 and 22. In this example, each fuel tank 20, 21, 22 is located inside a respective bay 20a, 21a, 22a between a respective pair of ribs. For example a first one of the bays 21a is between a first one of the ribs 14b and a second one of the ribs 14c.

The spars 12, 13 are spaced apart in a chordwise direction, and a length of each fuel tank extends in the chordwise direction.

In this case, only one fuel tank is housed in each bay, but in other embodiments each bay may have two or more fuel tanks.

While the wingbox assembly 5 is shown in this example with multiple fuel tanks, in an alternate embodiment, the wingbox assembly 5 may only house a single fuel tank.

The fuel tanks in this example are hydrogen fuel tanks. Referring to FIG. 3, a fuel cell system 30 is also located inside the wingbox, in a bay between a pair of ribs 14e, 14f. The fuel cell system 30 comprises a fuel cell 32 and a battery 33.

The fuel cell 32 is an electrochemical cell (or stack of cells) which converts chemical energy of the hydrogen fuel into electrical energy which is stored in the battery 33.

The battery 33 supplies electrical power to a propulsion system suspended under the wingbox.

A first fuel line 41 is located behind the rear spar 13 and is configured to deliver hydrogen fuel from twelve of the fuel tanks to the fuel cell system 30. A second fuel line 42 is located in front of the front spar 12 and is configured to deliver hydrogen fuel from the other ten fuel tanks to the fuel cell system 30. The use of two fuel lines 41, 42 provides an element of redundancy to the system.

In this example, the fuel tanks 21, 22 are connected to the first fuel line 41 which runs behind the rear spar 13, and the fuel tank 20 is connected to the second fuel line 42 which runs in front of the front spar 12.

Figure 7:
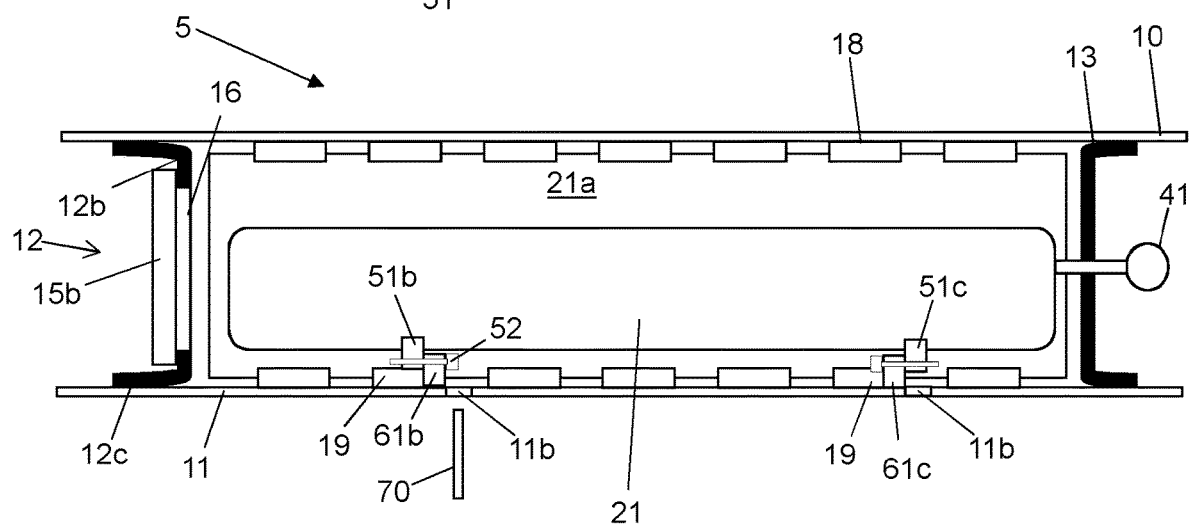
FIG. 7 is a side view of a bay with a fuel tank installed.

FIG. 4A shows a front view of the wingbox assembly 5 in greater detail. As shown in FIG. 7, the front spar 12 comprises a spar web 12b and a pair of spar flanges 12c. The spar web 12b is visible in the front views of FIGS. 4A and 4B.

The spar web 12b has a spar hole for each bay. A door 15a, 15b, 15c covers each spar hole, and fasteners 25 (such as bolts) attach each door to the spar. The fasteners 25 enable the door to act as a load-bearing element, and the fasteners 25 may be received as an interference fit.

FIG. 4B shows the front spar 12 with all of the doors removed to show the spar holes, and in FIG. 4A the door 15b covering the spar hole 16 of the central bay is removed so that the spar hole 16 is visible. Each spar hole is sized to enable a respective fuel tank to be removed from the bay through the spar hole. Each spar hole has a circular edge 16a, although in other embodiments the edge of the hole may have a different shape such as elliptical, oval, polygonal (e.g. hexagonal) etc.

Figure 6:
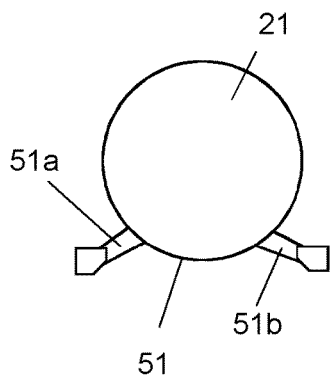
FIG. 6 is a front view of a fuel tank.

FIG. 5 is a front view of the wingbox assembly 5 showing fuel tanks 20-22 in three bays 20a-22a, with the front spar 12 and covers 10, 11 not shown. A front view of an exemplary one of the fuel tanks 21 is shown in FIG. 6.

Each fuel tank has a cylindrical tank wall 51 which carries two pairs of tank lugs extending from the tank wall 51. A front pair of tanks lugs is located at the front end of the fuel tank and can be seen in FIGS. 5 and 6. The front pair of tank lugs comprises a first tank lug 51a and a second tank lug 51b.

A rear pair of tank lugs is located at the rear end of each fuel tank. The rear pair of tank lugs is identical to the front pair of tank lugs. One of the rear pair of tank lugs is visible in FIG. 7 and labelled 51c. The other tank lug of the rear pair is not visible, but it is identical to the first tank lug 51a.

Each fuel tank may be made from a metallic material, with all parts (i.e. the tank wall 51 and the tank lugs 51a, 51b, 51c) machined from a single piece of metallic material. Alternatively the tank lugs may be attached to the tank wall 51—for instance by welding. However, more preferably each tank is made from a fibre-reinforced composite material. In this case, the tank lugs 51a, 51b, 51c may be co-bonded to the tank wall 51.

As shown in FIGS. 5 and 7, each rib comprises a rib web 17, a set of upper rib feet 18 attaching the rib to the upper cover 10, and a set of lower rib feet 19 attaching the rib to the lower cover 11. Each rib also has a pair of rib posts (not shown) which attach the front and rear edges of the rib to the front and rear spars 12, 13.

A front pair of rib lugs 61a, 61b is located at the front end of each rib. The front pair of rib lugs is visible in FIG. 5. A rear pair of rib lugs is located at the rear end of each rib. The rear pair of rib lugs is identical to the front pair of rib lugs 61a, 61b. One of the rear pair of rib lugs is visible in FIG. 7 and labelled 61c. Each rib lug 61a, 61b, 61c is attached to the rear face of a respective lower rib foot 19, and/or to the rib web 17.

Each rib may be made from a metallic material, with all parts (i.e. the web 17, the rib feet 18, 19 and the rib lugs 61a, 61b, 61c) machined from a single piece of metallic material. Alternatively the rib lugs may be attached to the rest of the rib—for instance by welding.

The lower cover 11 has an access hole 11b positioned next to each rib lug 61a, 61b, 61c.

Each tank lug secures a fuel tank to a rib via a respective one of the rib lugs. So for example the first tank lug 51a shown in FIG. 5 secures the fuel tank 21 to the first rib 14b via the rib lug 61a, and the second tank lug 51b secures the fuel tank 21 to the second rib 14c via the rib lug 61b. The lugs are connected by removable fasteners 52 (which may be bolts for example). Thus a first fastener 52 attaches the first tank lug 51a to the first one of the ribs 14b; and a second fastener 52 attaches the second tank lug 51b to the second one of the ribs 14c.

The rear pair of tank lugs at the rear end of the tank are attached to the ribs in a similar fashion. While each fuel tank in this example has two pairs of fuel tank lugs, it will be understood that optionally only one pair of fuel tank lugs may be provided per fuel tank.

During flight of the aircraft, aerodynamic effects create a bending force which tends to place the upper cover 10 in compression and the lower cover 11 in tension. This bending force urges the lower parts of the ribs away from each other, and the upper parts of the ribs towards each other. The fuel tank wall 51 and the tank lugs 51a, 51b, 51c are rigid, so by connecting the fuel tanks to the adjacent ribs via the tank lugs, a rigid structure is provided which can pick up these bending forces. The fasteners 52 are configured to enable the fuel tank to act as a load-bearing element, and the fasteners 52 may be received as an interference fit.

Providing a relative small number of tank lugs (in this case four) ensures that the resulting structure is more likely to be statically determinate.

During assembly of the wingbox assembly 5, the fuel tanks may be loaded from above and secured to the ribs before the upper cover 10 is fitted by securing it to the upper rib feet 18 and to the upper spar flanges. After a period of operation of the aircraft it may be necessary to remove one or more of the fuel tanks without first removing the upper cover 10. A method of disassembling the aircraft wing by removing the fuel tank 21 from a first one of the bays 21a through the spar hole 16 will now be described with reference to FIGS. 8 and 9.

First, a tool 70 shown in FIG. 7 is used to remove or otherwise disengage the fasteners 52 to detach the tank lugs from the ribs. The tool 70 may gain access to the fasteners 52 via the access holes 11b in the lower cover 11.

The wing 3 has leading edge structure (for instance slats, a D-nose fairing etc.) in front of the front spar 12, which is removed as a module to gain access to the front spar. The fasteners 25 are then taken out and the door 15b removed to uncover the spar hole 16 and provide access to the bay 21a.

Figure 8:
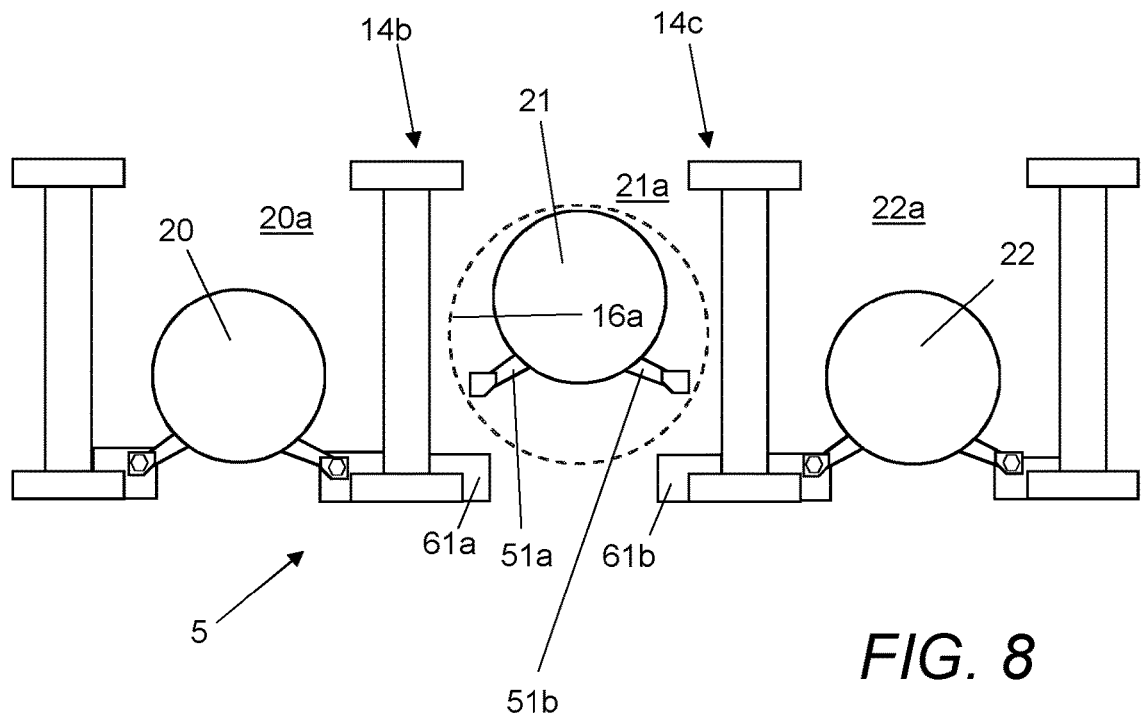
FIG. 8 is a front view showing a fuel tank raised to a removal position.
Figure 9:
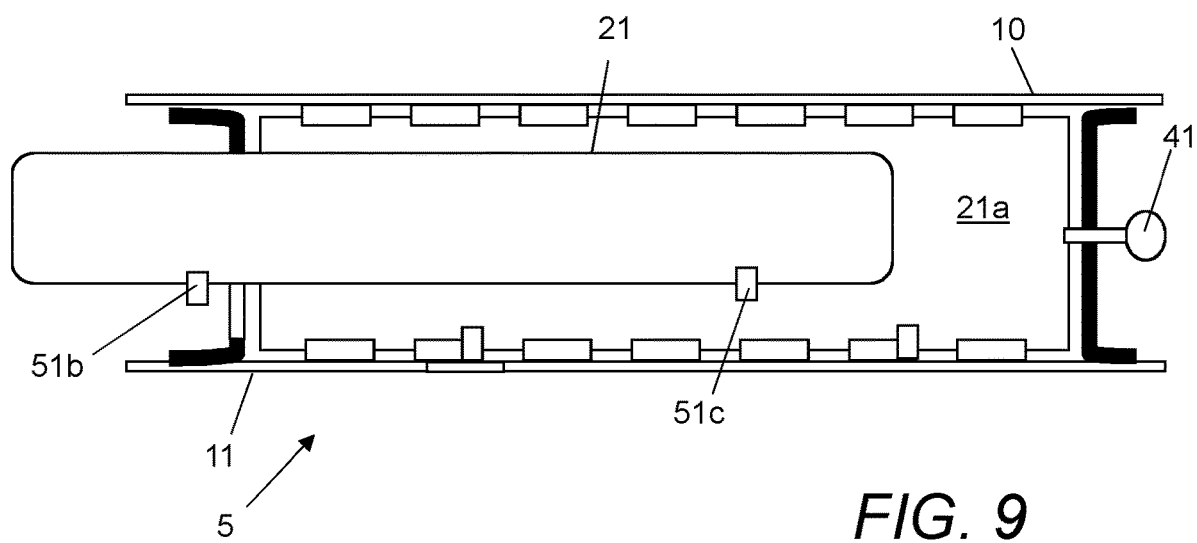
FIG. 9 is a side view showing the fuel tank of FIG. 8 being removed through a spar hole.

After the tank lugs have been detached, the fuel tank is moved laterally (in this case by lifting it up) to bring the fuel tank to a removal position shown in FIG. 8 which enables the tank lugs 51a, 51b, 51c and the tank wall 51 to fit through the spar hole 16. After the tank has been lifted up to the removal position, the fuel tank (including the tank lugs) is removed from the first one of the bays 21a through the spar hole 16.

FIG. 8 shows in dashed line the circular outline of the edge 16a of the spar hole 16. It can be seen that in this raised removal position the fuel tank 21 (including the tank lugs 51a, 51b, 51c) can be removed along its length through the spar hole 16 without clashing with the edge 16a.

After the fuel tank 21 has been removed as described above, the fuel tank 21 (or a replacement fuel tank) can be installed in the bay 21a by reversing the procedure.

In the example above, the fasteners 52 are removed by a tool 70 which gains access to the bay 21a via access holes 11b in the lower cover. In an alternative embodiment, the tool 70 may gain access into the bay 21a via the spar hole. In this case, the tool 70 must be sufficiently long to reach the fasteners 52 at the rear end of the bay. For instance the tool 70 may be a robot arm.

FIGS. 10A-10C shows an alternative embodiment in which the fuel tank 21 has retractable tank lugs 70a, 70b which can be rotated (as shown in FIG. 9B) from an extended position (FIG. 9A) to a retracted position (FIG. 9C). In this case, once the tank lugs 70a, 70b are in their retracted position shown in FIG. 10, they can fit past the edge 16a of the spar hole without having to first lift the fuel tank 21 up to a raised removal position. This is indicated in FIG. 11 which shows how the retracted lugs 70a, 70b clear the edge 16a of the spar hole.

An advantage of this arrangement is that the fuel tank 21 can be made larger in comparison with a tank with fixed tank lugs as in FIG. 8, and/or the spar hole can be made smaller. The rib lugs 61a, 61b in FIG. 11 can also be made smaller compared with the rib lugs 61a, 61b in FIG. 8.

The tank wall 51 is rigid, enabling it to contain the hydrogen fuel and also act as a structural part, reacting the wing bending forces as explained above. The rigidity of the tank wall 51 means that it cannot be collapsed before it is removed.

In this example the tank wall 51 is cylindrical (i.e. circular in cross-section) but this is not strictly essential and other tubular cross-sections can be envisaged.

The fuel tanks and the spar holes are configured to enable the tank wall 51 carrying the tank lugs to pass through the spar holes without requiring the tank wall 51 to be collapsed.

The use of tank lugs (rather than an attachment flange extending around the full periphery of the fuel tank) enables the tank to be removed without clashing with the edge of the spar hole, whilst at the same time being able to connect the tank lugs to the ribs.

In the examples described above, the fuel tanks are hydrogen fuel tanks, but in other examples the fuel tanks may contain any other fuel. Typically the fuel tanks contain a fuel which can be used by a fuel cell to convert chemical energy into electrical energy.

In the examples described above, the fuel tanks are removed through spar holes in the front spar 12. This is preferred because the wing 3 has leading edge structure in front of the front spar 12 which is easier to remove than the trailing edge structure (flaps, spoilers etc.) behind the rear spar 13. However, in an alternative embodiment the fuel tanks may be removable through spar holes in the rear spar 13.

Where the word or appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft wingbox assembly, comprising:
   a wingbox with an upper cover,
   a lower cover and a pair of spars;
   a plurality of ribs in the wingbox, wherein the ribs divide the wingbox into bays;
   a fuel tank in a first one of the bays, wherein one of the spars comprises a spar hole which is configured to enable the fuel tank to be removed from the first one of the bays through the spar hole; and,
   wherein each of the ribs is attached to both of the covers and to both of the spars.

2. The aircraft wingbox assembly according to claim 1, further comprising a door covering the spar hole; and fasteners attaching the door to the spar.

3. The aircraft wingbox assembly according to claim 1, wherein the first one of the bays is between a first one of the ribs and a second one of the ribs.

4. The aircraft wingbox assembly according to claim 1, wherein the fuel tank comprises a tank wall and first and second tank lugs extending from the fuel tank wall; and the assembly further comprises: a first fastener attaching the first tank lug to the first one of the ribs; and a second fastener attaching the second tank lug to the second one of the ribs, wherein the fuel tanks and the spar hole are configured to enable the fuel tank including both of the tank lugs to pass through the spar hole.

5. The aircraft wingbox assembly according to claim 1, wherein the fuel tank is a hydrogen fuel tank.

6. The aircraft wingbox assembly according to claim 1, wherein the fuel tank comprises a rigid tank wall.

7. The aircraft wingbox assembly according to claim 1, wherein the fuel tank contains a fuel which is a pressurised gas or a cryogenically cooled liquid.

8. The aircraft wingbox assembly according to claim 1, wherein the spars are spaced apart in a chordwise direction, and a length of the fuel tank extends in the chordwise direction.

9. The aircraft wingbox assembly according to claim 1, wherein the spars extend in a spanwise direction; and the bays are spaced apart in the spanwise direction.

10. The aircraft wingbox assembly according to claim 1, wherein the fuel tank is a first fuel tank; the pair of spars comprise a forward spar and a rear spar; and the assembly further comprises: a fuel cell; a first fuel line coupling the first fuel tank to the fuel cell; a second fuel tank in a second one of the bays; and a second fuel line coupling the second fuel tank to the fuel cell, wherein the first fuel line is located behind the rear spar and the second fuel line is located in front of the front spar.

11. A method of disassembling the aircraft wingbox assembly according to claim 1, the method comprising: removing the fuel tank from the first one of the bays through the spar hole.

12. The method according to claim 11, further comprising removing a door covering the spar hole.

13. The method according to claim 11, wherein the fuel tank is attached to the wingbox or to one or more of the ribs by one or more fasteners, and the method further comprises inserting a tool into the first one of the bays, and disengaging the fastener(s) with the tool.

14. The method according to claim 11, wherein the fuel tank has a length, and the fuel tank moves along its length as it is removed through the spar hole.

15. The method according to claim 11, wherein the fuel tank comprises a fuel tank wall which is not collapsed before the fuel tank is removed.

16. An aircraft wing comprising the aircraft wingbox assembly according to claim 1.

17. An aircraft comprising the aircraft wingbox assembly according to claim 1.

18. A spar of the aircraft wingbox of claim 1, the spar comprising:
a spar web; a spar flange;
a spar hole in the spar web, wherein the spar hole is sized to enable a fuel tank to be removed through the spar hole; and,
wherein the spar hole has an edge which is circular, elliptical, oval, or polygonal.

19. The spar according to claim 18, further comprising a door covering the spar hole; and fasteners attaching the door to the spar.

20. The spar according to claim 18, wherein said spar flange comprises an upper spar flange for attaching the spar to an upper cover of the aircraft wingbox, and the spar further comprises a lower spar flange for attaching the spar to a lower cover of the aircraft wingbox.

* * * * *